United States Patent
Buethker

(10) Patent No.: US 8,129,961 B2
(45) Date of Patent: Mar. 6, 2012

(54) DC/DC-CONVERTER

(75) Inventor: Henricus C. J. Buethker, Meirlo (NL)

(73) Assignee: ST-Ericsson SA, Geneva (CH)

( * ) Notice: Subject to any disclaimer, the term of this patent is extended or adjusted under 35 U.S.C. 154(b) by 301 days.

(21) Appl. No.: 12/310,213

(22) PCT Filed: Aug. 10, 2007

(86) PCT No.: PCT/IB2007/053192
§ 371 (c)(1),
(2), (4) Date: Nov. 16, 2009

(87) PCT Pub. No.: WO2008/020385
PCT Pub. Date: Feb. 21, 2008

(65) Prior Publication Data
US 2010/0066322 A1   Mar. 18, 2010

(30) Foreign Application Priority Data
Aug. 15, 2006 (EP) .................................. 06118938

(51) Int. Cl.
*G05F 1/613* (2006.01)
(52) U.S. Cl. ......... 323/225; 323/224; 323/284; 323/283
(58) Field of Classification Search ............... 323/224, 323/225, 283, 284, 285
See application file for complete search history.

(56) References Cited

U.S. PATENT DOCUMENTS 7,129,680 B2 * 10/2006 Higashitani et al. ........... 323/224

FOREIGN PATENT DOCUMENTS

| EP | 1 689 069 A2 | 8/2006 |
|----|--------------|--------|
| EP | 1 689 070 A2 | 8/2006 |
| WO | WO 2006/018772 A2 | 2/2006 |

OTHER PUBLICATIONS

Written Opinion of the International Searching Authority dated Feb. 15, 2009 in connection with PCT Patent Application No. PCT/IB2007/053192.
International Search Report dated Feb. 6, 2008 in connection with PCT Patent Application No. PCT/IB2007/053192.

* cited by examiner

*Primary Examiner* — Shawn Riley

(57) ABSTRACT

The present invention relates voltage conversion device in which a regulated output voltage is supplied by current pulses generated by the voltage conversion device from a voltage source. In particular, the invention relates to an improved control of an pulse frequency modulation (PFM) operation mode in which the frequency of the generated current pulses is modulated to regulated the desired output voltage, namely how PFM pulses can be generated without the need for a high-frequency clock of a time controlled system. By having pulse phases are current mode controlled and providing a mode detector to generate the right kind of current pulse, the high-frequency clock is no longer needed. Further, the presented solution allows for a higher PWM as well as PFM frequency, the external components of the converter can be made smaller. Eliminating the need for a high-frequency clock makes the device simpler, smaller and more energy-efficient.

11 Claims, 8 Drawing Sheets

DC/DC-CONVERTER

CROSS-REFERENCE TO RELATED APPLICATION(S)

The present application claims priority under 35 U.S.C. §4365 to International Patent Application No. PCT/IB2007/053192 filed Aug. 10, 2007, entitled "DC/DC-CONVERTER". International Patent Application No. PCT/IB2007/053192 claims priority under 35 U.S.C. §365 and/or 35 U.S.C. §119 (a) to European Patent Application No. 06118938.7 filed Aug. 15, 2006 and which are incorporated herein by reference into the present disclosure as if fully set forth herein.

FIELD OF THE INVENTION

The present invention relates to voltage conversion device according to claim 1 and a voltage conversion method according to claim 11.

BACKGROUND OF THE INVENTION

An important aspect of portable electronic devices is the provision, more particular generation and maintenance, of a regulated voltage from an unregulated voltage source, for example a battery. For the generation and maintenance of the required regulated voltage a voltage regulator is used, which is often called DC/DC-converter. Moreover, since the voltage provided by a battery varies in a relative broad range from fully charged status up to the its discharged status, a voltage regulator is required which is able to provide a certain output voltage from a range of input voltages, which comprises higher as well as lower voltage values as the certain output voltage.

Basically, a common implementation of a voltage regulator or voltage regulating device is a switching regulator, which, generally, is a circuit that uses an energy-storage element, such as an inductor or a coil, to transfer energy from an unregulated power source, for instance the afore mentioned battery, to a load in discrete pulses, which are sometimes also referred to as bursts. By feedback circuitry the energy transfer process can be controlled for maintaining a constant output voltage at a load connected to the output of the voltage-regulating device.

The family of switching voltage regulators comprises various types, which are commonly used today in portable electronic devices. One example is a buck converter, which is an inductor based voltage regulator used to step-down (buck) the unregulated voltage source. In contrast hereto, a boost converter is an inductor based voltage regulator used to step-up (boost) the unregulated voltage source. Accordingly, a buck-boost converter is required to provide a regulated output voltage form a source of which the voltage varies from being higher over being nearly the same to being lower. The buck-boost converter provides a regulated output over large variations in the unregulated voltage source, but tends to be less efficient than the buck or boost converter.

As disclosed in WO 2006/018772, one approach to improve such a DC/DC buck-boost or up/down, respectively, converter is to have two operating modes: a so-called pulse width modulated (PWM) operation mode and a pulse frequency modulated (PFM) operation mode. Basically, the PWM operation mode comprises current pulses with constant frequency and there is a continuous current. The PWM operation mode is preferred when higher currents are required from the current source at the input of the converter to the output of the converter. The PFM operation mode comprises pulses with variable frequency and there is a discontinuous current. The PFM operation mode is mainly used for low power loads that are when small or less current is to be carried form the current source to the output of the converter. In such cases the PFM operation mode is more efficient as the PWM operation mode due to the reduction of the switching currents needed for the switching elements in the converter.

In the PWM mode, in principle, a control signal, e.g. having a waveform of square wave, is provided to the control terminal of at least one switching element to control its ON/OFF or "conducting/no conducting" states, respectively. By increasing the average ON time of the switching device the output voltage may be increased, vice versa. Accordingly, modulating the duty cycle of the square wave control signal regulates the output voltage.

In the PFM mode, basically, the switching frequency of the control signal is changed in order to keep the output voltage Vout constant. In principle, an oscillator and a driver circuit, which generates the corresponding control signal, for example a rectangular signal, supplied to the control terminal of the at least one switching element, may be used to control the switched operating mode. The PFM mode of the DC/DC converter provides better efficiency at small output current levels that does the above PWM operation mode. Firstly, the PFM operation mode requires less turn-on transitions to maintain a constant output voltage than the PWM operation mode does, which results in a lower gate-drive power dissipation of the switching transistor. Further, the PFM operation mode can be achieved with a much simpler control circuit having fewer components; the power dissipation in a control loop of the PFM operation mode is less than that of the control loop of the PWM operation mode. However, when the output current reaches a moderate level and higher, the PFM operation mode of voltage regulation becomes impractical, since the maximum output current available from the PFM operation mode is generally much less than that available from the PWM operation mode.

WO 2006/018772 discloses an approach to determine the timing and shape of a PFM operation mode pulses in an automatic up/down converter. Basically, a look-up table containing a list of ON-times for the UP-phase and the FORWARD-phase is provided, wherein the length of a PFM mode pulse is measured and if it is too long, shorter ON-times are chosen. When the converter operates as a down-converter, the ON-time for the UP-phase is set to zero. When the converter operates as an up-converter, the ON-time for the DOWN-phase is set to zero. For instance, in a range of approximately 90% of Vbat up to 110% of Vbat for Vout, both an UP-phase and a DOWN-phase exist. However, one drawback in this automatic up/down-converter is the need for a high-frequency clock for the control circuit of the converter. In particular, the clock needs to be approximately 8 times as high in frequency as the respective PFM frequency. As a result, when the desired PFM frequency increases, the required clock frequency increases to unacceptable levels due to the fact that high clock frequencies mean large dissipation in the clock generator, which is not desired for portable applications. Further, it also becomes more difficult to obtain the required accuracy.

SUMMARY OF THE INVENTION

It is therefore one object to provide a DC/DC-converter with improved efficiency. It is another object of the present invention solution to provide a solution for an improved efficiency of the converter circuit such that required clock frequency of the converter circuit may be decreased. The invention is defined by the independent claims. Dependent claims define advantageous embodiments.

In an embodiment, a device comprises at least an input terminal, a ground terminal and an output terminal for providing a regulated output voltage from a current source connectable to the input terminal. The device further comprises:
- a switching circuit with a plurality of switching elements and a switchable current path including an inductive element, wherein the switchable current path is switchable such that the current path is arranged as a forward-phase current path connecting the input terminal and the output terminal, as a up-phase current path connecting the input terminal and ground terminal, or as a down-phase current path connecting the ground terminal and the output terminal;
- a control unit configured to operate the plurality of switching elements in accordance to at least one switching operation mode, in which a current is delivered to the output terminal via the switchable current path by current pulses comprising at least two phases; and
- a mode detector for detecting an actual converting mode of the device; wherein the control unit is further configured to control in a first switching operation mode the individual current pulses such
  that a individual phase of a individual current pulse is ended when a current in the respective switchable current path of the respective phase reaches a respective predetermined current setpoint value, and
  that upon an up-converting mode signal provided by the mode detector to the control unit, the control unit being configured to start after a down-phase with a up-phase for the next current pulse and otherwise with a forward-phase for the next current pulse.

As it regards the method for controlling a conversion operation of a variable input voltage to a regulated output voltage, wherein the output voltage is regulated by a controlled supply of electrical energy in from of current pulses, in one embodiment the method comprises operating a plurality of switching elements of a switching circuit having a switchable current path with an inductive element such that a current pulse comprises at least two phases, of which in a forward-phase the current path provides current from the input to the output, in a up-phase the current path provides current from the input to ground, and in a down-phase the current path provides current from the ground to the output; controlling in a first switching operation mode the individual current pulses such that a individual phase of a individual current pulse is ended when a current in the respective switchable current path of the respective phase reaches a respective predetermined current setpoint value, and detecting whether an actual converting mode of the conversion operation is an up-converting mode or not; and starting after a down-phase of a current pulse, upon detection of the actual converting mode being an up-converting mode, the next current pulse with an up-phase and otherwise with a forward-phase.

These and other aspects of the invention will be apparent from and elucidated with reference to the embodiment(s) described hereinafter.

In the first embodiment, the device may further comprise a first current sensor in the forward-phase current path, a first digital analog converter connected the control unit for setting a first predetermined current setpoint value, the output of the first current sensor and the output of the first digital analog converter being connected to a first comparator. Moreover, the device may also comprise a second current sensor in the up-phase current path, a second digital analog converter connected the control unit for setting a second predetermined current setpoint value, the output of the second current sensor and the output of the second digital analog converter being connected to a second comparator.

When the voltage at the input terminal is larger than an actual voltage at the output terminal, in a forward-phase the control unit can be configured to detect the end of an actual forward-phase by means of an output signal of the first comparator. Further, when the voltage at the input terminal is smaller than an actual voltage at the output terminal, the control unit is configured to set in a forward-phase the setpoint value of the first comparator to zero to detect the end of an actual forward-phase by means of an output signal of the first comparator.

In one specific further development, the control unit is further configured to control the individual current pulses of the first switching operation mode such that an forward-phase and an up-phase is ended upon detection of a predetermined peak current value in a respective switchable current path, that is in the respective forward-phase current path or up-phase current path, respectively. Accordingly, the control unit can further be configured to control the current pulses of the first switching operation mode such that a down-phase is ended upon detection of a zero current in the down-phase current path.

Upon entering the first switching operation mode, an initial setpoint value of the second predetermined current setpoint may be set to a predetermined minimum of a full-scale value of the second digital analog converter. In a further development, the control unit is configured to adjust the setpoint value of the second predetermined current setpoint value by measuring the length of the individual current pulses. In this connection, it has been found as applicable, that a setpoint value of the first predetermined current setpoint value may be set to a predetermined percentage above the actual second predetermined current setpoint value.

In a further development of the afore-described embodiments, the device further comprises a counter for counting of the clock cycles of the control unit during a current pulse. A counter value of the counter is provided to the control unit, which may be configured to adjust the second setpoint value such that current pulse duration in the first switching operation mode is longer than in the second switching operation mode. As a result, a hysteresis is obtained, which allows for saving on switching losses.

By means of the counter for clock cycles, a nominal length of an individual current pulse of the first switching operation mode, being a pulse frequency modulation (PFM) mode, can be set to the length of more than one cycle, preferably at least two cycles of a second switching operation mode being a pulse width modulation (PWM) mode. Thus, the control unit can be configured to set, after a predetermined nominal cycle time, a current value for the up-phase current path to zero such that a down-phase is forced.

In one embodiment, the peak current for the current path in the pulse frequency modulation (PFM) mode is set to a value high enough such that an unstable entering the pulse width modulation (PWM) mode is prevented.

The control unit is configured to switch from the PWM (second switching operation) mode to the PFM (first switching operation) mode, when a predetermined number of zero currents are detected in a predetermined number of cycles of the PWM mode, and when a voltage at the output terminal has a predestined nominal value. Preferably, the control unit is configured to switch from the PWM mode to the PFM mode, when the current in the current path becomes zero, because at that moment, respective switching elements in the current path are turned off. In turn, the control unit is configured to switch from the PFM mode to the PWM mode, when a voltage at the output terminal is below a reference value for a predetermined number of cycles of the PWM mode, for instance, after at least two consecutive cycles.

To sum it up, the basic idea of the present invention is directed on the aspect of generation of the current pulses in the PFM operation mode without a needed high-frequency clock as in known converter circuits. By the solution provided herein the required clock frequency needs only to be about twice the frequency as in PWM operation mode of the converter circuit, but not eight times as high. This is basically achieved by use of peak current mode control also in PFM operation mode, thus the length of the current pulses can be adjusted without need of a high frequency clock as a time reference. Further, be means of the mode detector, the right kind of current pulse of the three possible kinds of PFM pulses: up-only pulses, down-only pulses and three-phase pulses can be generated.

Furthermore, by the presented solution a higher frequency for the PWM as well PFM operation mode can be used, since the PWM frequency needs to be only about twice the desired PFM frequency. As a consequence of a higher nominal frequency of the PWM mode, the external components (coil and capacitor) can be made smaller. Moreover, by eliminating the need for a high-frequency clock the whole device becomes much simpler, smaller and most important more energy-efficient. For instance, the converter can be configured such that the PFM frequency is about half the PWM frequency, but it may however also be ⅓ or ¼, for example.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION OF THE EMBODIMENTS

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
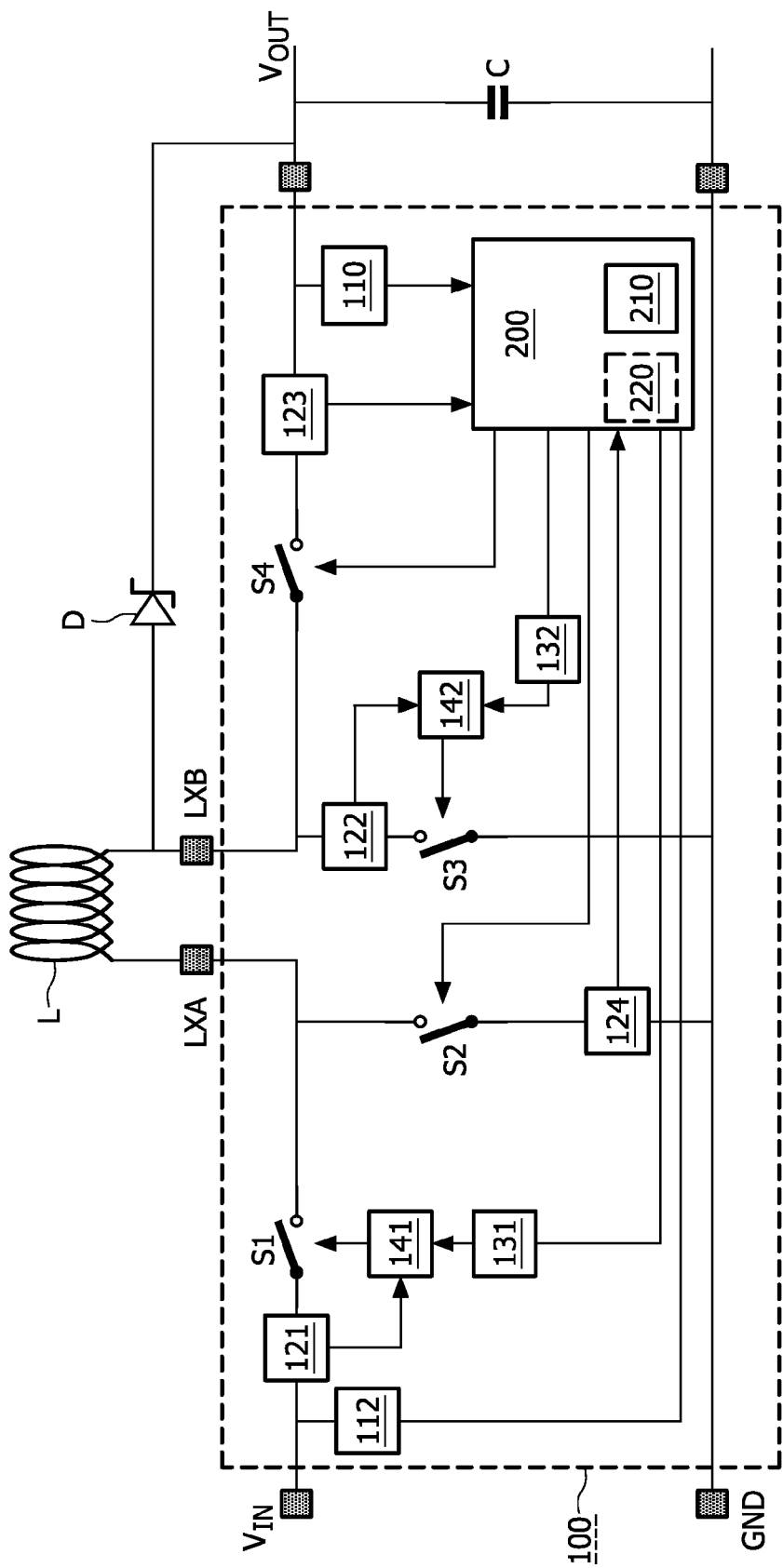
FIG. 1 is schematic block diagram of an embodiment of a converter of the invention.

Firstly reference is made to FIG. 1, which shows a conceptual block diagram of one particular embodiment of an up/down voltage regulator or converter circuit 100 according to the invention. In general, the converter 100 is arranged to transfer electrical energy from an unregulated voltage source at the input terminal Vin to a load (not shown) at the output terminal Vout. In practice, the voltage source at the input terminal Vin can be a battery or alike.

Basically, the converter circuit 100 provides three kinds of conversion modes: an up-mode, in which an input voltage Vin lower than a desired output voltage Vout is converted up or boosted, and a down-mode, in which an input voltage higher then a desired output voltage Vout is converted down. Further, the converter circuit 100 comprises a so-called automatic up/down-mode or auto-mode for short, where the input voltage may be substantially equal to the desired output voltage Vout. It goes without saying that the shown conceptual block diagram of the converter circuit 100 is provided for better understanding as an example, but not to restrict the present invention exactly thereon.

The converter circuit 100 comprises digital control circuitry, herein called control unit or in short controller 200, as control means for the conversion modes of the converter, in particular for control of the respective switching means S1, S2, S3, and S4. Further, the controller 200 comprises storage means 210, which can be a digital memory for storing program code for the controller 200 as well as for required operational data or parameter values of the conversion modes.

In principle, the digital controller 200 senses an actual value of the output voltage at the terminal Vout by a respective voltage monitoring means, which can be an analog-to-digital converter (ADC) 110. Without going in closer details, the required resolution of the ADC 110 can be limited to some target voltage windows, for example represented by predetermined voltage levels, preferably arranged symmetrically around a desired nominal output voltage. Such voltage levels define signal windows, which may be arranged in symmetrical distance to the desired output voltage. The controller 200 uses the actual condition of the output voltage with respect the generation of current pulses by which electrical energy is transferred from the input to the output of the converter 100.

Further, the controller 200 monitors the electrical current in an energy storage element, which is connected to terminals LXA and LXB and which is an inductor or coil L. Several switchable current paths in the converter 100, which all comprise the coil L, can be monitored by means of respective current monitoring means 121, 122, 123 and 124. As current monitor means or current sensor, for instance, can be used a current sensing semiconductor device, e.g. a field effect transistor (FET) connected in parallel towards a respective switching element S1, S2, S3 and S4. A voltage of a FET is proportional to the respective current through the respective parallel-connected switching element. Alternatively, instead of a current sensing device the voltage across the particular switching element S1, S2, S3 and S4 itself can be used as information on the value of the respective current in the switchable current path. Basically, the controller 200 regulates a voltage at the output terminal Vout at any level within the operating limits of the converter 100 by controlling or operating the manner in which electrical energy is transferred from the input terminal Vin via the coil L to the output terminal Vout.

Furthermore, the digital controller 200 is configured by the program codes stored in the memory 210 to control each switching element S1, S2, S3 and S4 in accordance to the respective conversion mode of the converter 100. Thus, the converter circuit 100 performs under control of the digital controller 200 a well-defined switching operation by which electrical energy is transferred from the input voltage at the input terminal Vin via the inductor L to the output terminal Vout. Any semiconductor switching element, e.g. a MOS transistor, may be used for implementation of the respective switching elements S1, S2, S3 and S4. Basically, by means of the switching elements S1, S2, S3 and S4 three predetermined current paths for a current through inductor or coil L during the switching operation of the converter circuit 100 can be rearranged.

One major aspect of the converter 100 is the fact, that the converter 100 may be operated by the controller 200 in two switching operation modes: a switching operation mode, in which current pulses have a fixed frequency and in which the amount of electrical energy of the individual current pulses is controlled by employing pulse-width modulation (PWM) in order to regulate the output voltage at Vout by switching the switching elements S1 to S4.

When a load connected to the output requires less or nearly no current, the converter 100 enters or is transitioned into a hysteretic operation mode, in which the amount of electrical energy of the individual current pulses is controlled by employing pulse-frequency modulation (PFM). In the PFM operation mode, the converter 100 may be idle when the output voltage is within its regulated value, and the converter 100 may deliver energy from its input to the output only when the output voltage drops out of regulation. When the converter 100 is idle, the voltage converter or regulator is also said to be in a "sleep mode".

Figure 2:
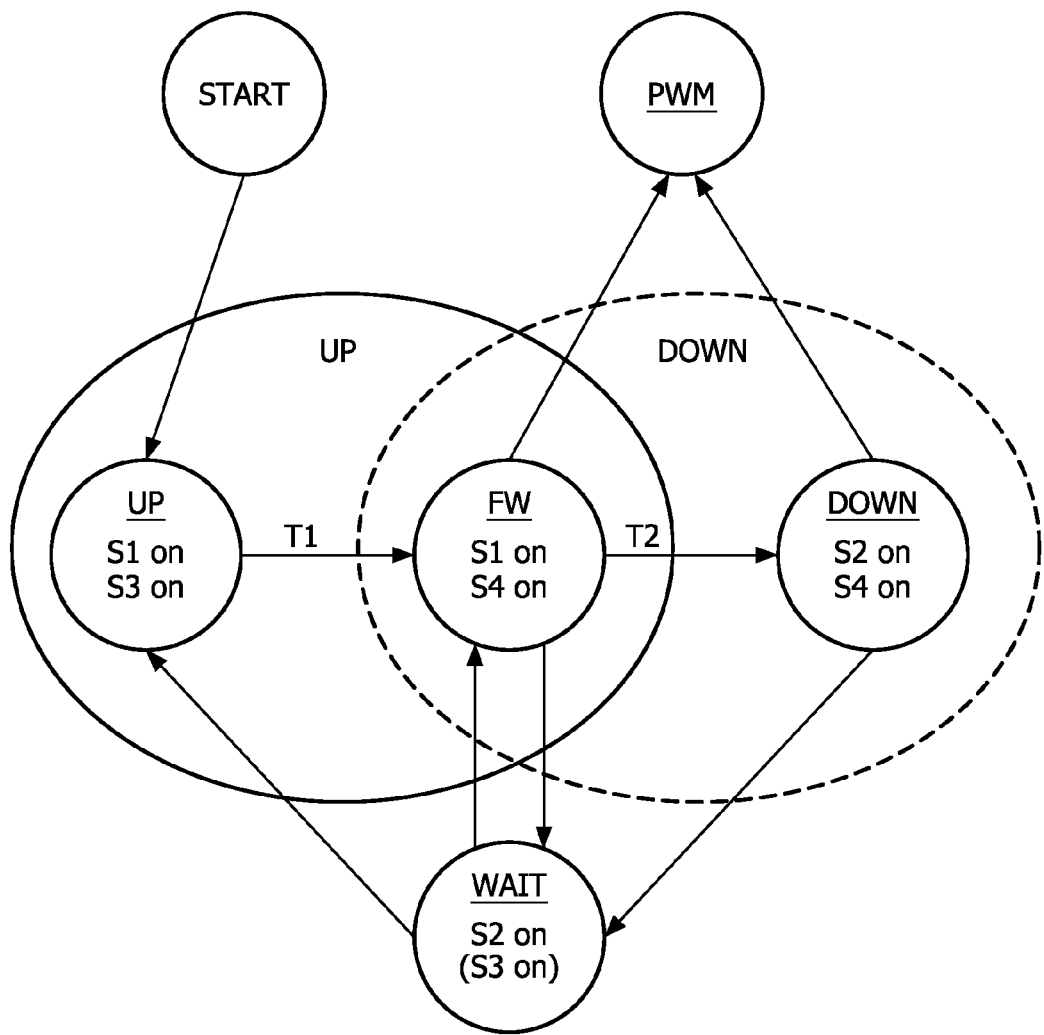
FIG. 2 is a state diagram of the PFM operation mode of the prior art.

In FIG. 2 a state diagram for the PFM operation mode of the converter 100 of FIG. 1 is depicted which basically represents the states of the switches in the converter 100 during a PFM operation mode cycle. Accordingly, a cycle can be divided in phases:

1. A first phase is an "up-phase", where the switching elements S1 and S3 are closed or conducting. Thus, the coil L is connected between Vin and ground GND and the current through the coil L will increase. In particular, there is a current at the input Vin, for instance from a battery, but no current to the output Vout. In other words, an up-phase current path goes from the terminal Vin over switching element S1 through the coil L over switching element S3 to ground GND.

2. A second phase is a "forward-phase", where the switching elements S1 and S4 are closed. The coil L is now connected between Vin and Vout and the current through the coil L can either increase or decrease. In this phase, there is direct energy transfer from the voltage source connected to the input Vin to the output Vout. In other words, a forward-phase current path goes from the terminal Vin over switching element S1 through the inductor L over switching element S4 to the terminal Vout.

3. A third phase is a "down-phase", where the switching means S2 and S4 are closed. The coil L is connected between ground GND and the terminal Vout and the current will decrease. A current flows to the output, but not from the voltage source connected to the input terminal Vin. In other words, a down-phase current path goes from ground GND over switching element S2 through inductor L over switching element S4 to terminal Vout.

In the PFM operation mode state diagram of FIG. 2 of the known DC/DC-converter, the durations of an up-phase and a down-phase of a current pulse are predetermined by the time T1 and time T2, respectively. In other words, the up-phase and forward-phase are controlled by means of predetermined or preconfigured times, which requires a respective reference timer for reliable time measurement. As stated above, in one known DC/DC-converter the required high-frequency clock was 8 times higher as the frequency of the current pulses in the PWM operation mode, even when the target length has been 16 clock periods of a reference clock, whereas the PWM switching operation cycle time is 8 clock periods such that the maximum frequency in PFM mode is half the PWM frequency. It should be noted even that in this example it is assumed that the PFM frequency is half the PWM frequency, but it might however also be ⅓ or ¼ multiple for example.

According to the basic idea of the present invention, the PFM operation mode is improved by means of a peak current control system, instead of the afore-mentioned fixed-time system. Therefor, the peak current comparators 141 and 142 and respective digital-to-analog-converters (DACs) 131, 132 of the converter 100 are used. The comparators 141, 142 and DACs 131, 132 can be switched off between individual PFM pulses in order to save power.

Accordingly, the improved PFM operation mode may comprise three conversion modes, which will be described in detail with reference to the FIGS. 3, 4, and 5.

With regard to the up-conversion mode, there an individual current pulse comprises an up-phase and a forward-phase. A state diagram of the up-conversion mode is depicted in FIG. 3 and respective up-conversion mode current pulses P1 and P2 are illustrated in FIG. 4. In FIG. 3, the up-conversion mode starts an individual current pulse by an up-phase 310, in which the switching elements S1 and S3 are closed (whereas switching elements S2 and S4 are open) such that the up-phase current path is arranged to build up an increasing current in the coil L. In FIG. 4, the up-phase U is depicted by the increasing edge of the current pulse P1.

By means of setting and detecting a respective predetermined current value in the up-phase current path the end of the up-phase can be controlled. In the converter 100 of FIG. 1 a respective current value setpoint for the up-phase current path can be set by the controller 200 in the DAC 132. A respective digital setpoint value provided from the controller 200 is converted by the DAC 132 into a respective analog value, which is provided to the comparator 142. Hence, the end of the up-phase is detected (320) when the current in the up-phase current path reaches the setpoint peak current value (peak current Npeak in FIG. 4).

Here it is worth noting that FIG. 1 the output of the comparator 142 is directly used for control of the switching element S3, but it is also possible that the output of the comparator 142 is provided to the controller 200, which in turn provides a respective switching control signal to the switching element S2. The same is applicable for the other DAC 131 and other comparator 141, as well.

Figure 3:
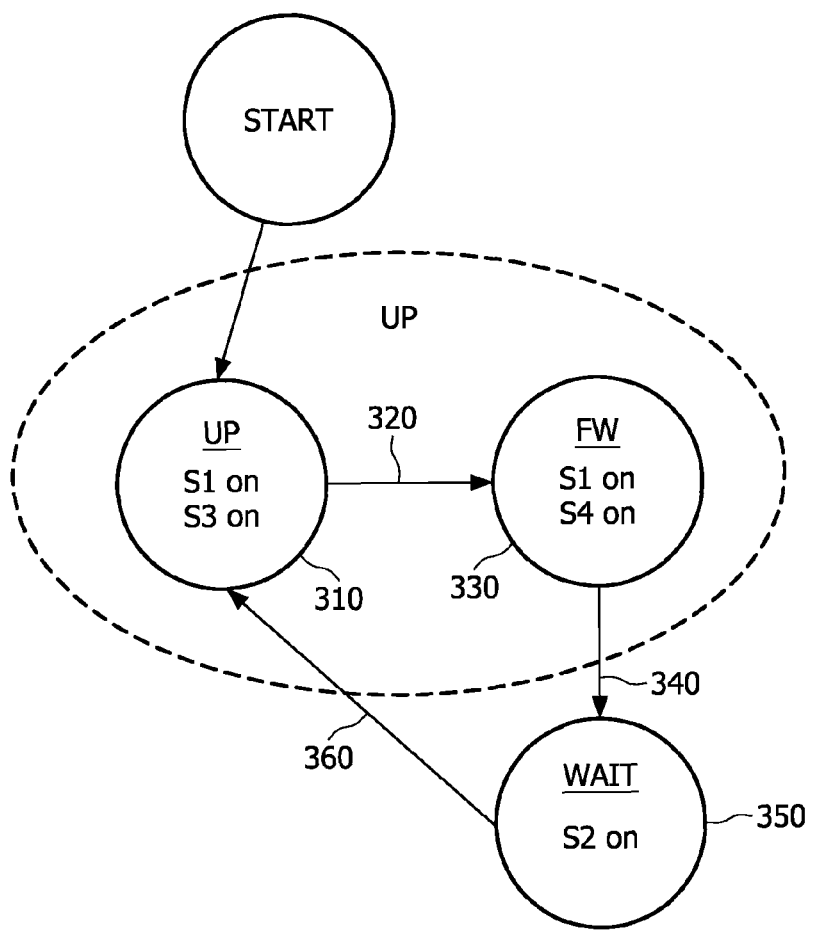
FIG. 3 shows the state diagram of the of the up-conversion mode of the device according to the invention.
Figure 4:
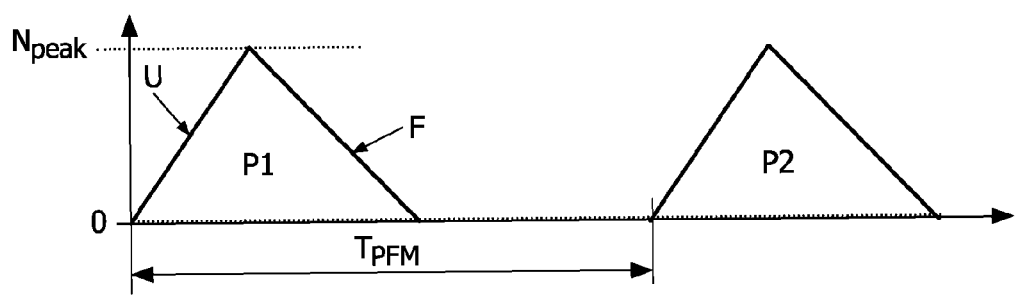
FIG. 4 is an example of a PFM pulse waveform of the up-conversion mode of FIG. 3.

In FIG. 3, the up-phase of the current pulse is followed by a forward-phase 330, in which the switching elements S1 and S4 are closed (whereas switching elements S2 and S3 are open) such that the forward-phase current path is arranged to deliver an electrical current via the coil L directly from the input Vin to the output Vout. The end of the forward-phase is detected by the controller 200 by means of a respective current sensor 123, which indicates the end of the forward-phase when a zero (0) current in the forward-current path is measured (340). In FIG. 4, the forward-phase is illustrated by the falling edge F of the current pulse P1.

In FIG. 3, after the forward-phase of a current pulse in the up-conversion mode follows a wait-phase (which is not part of a current pulse), the end of which is detected by monitoring the output voltage at the terminal Vout. That is if the output voltage reaches a predetermined value below the desired output voltage the next current pulse will be started (360). In FIG. 4, the period $T_{PFM}$ is the time lapsed between the start points of two consecutive current pulses P1 and P2, which corresponds to the instant PFM frequency of the current pulses.

Figure 5:
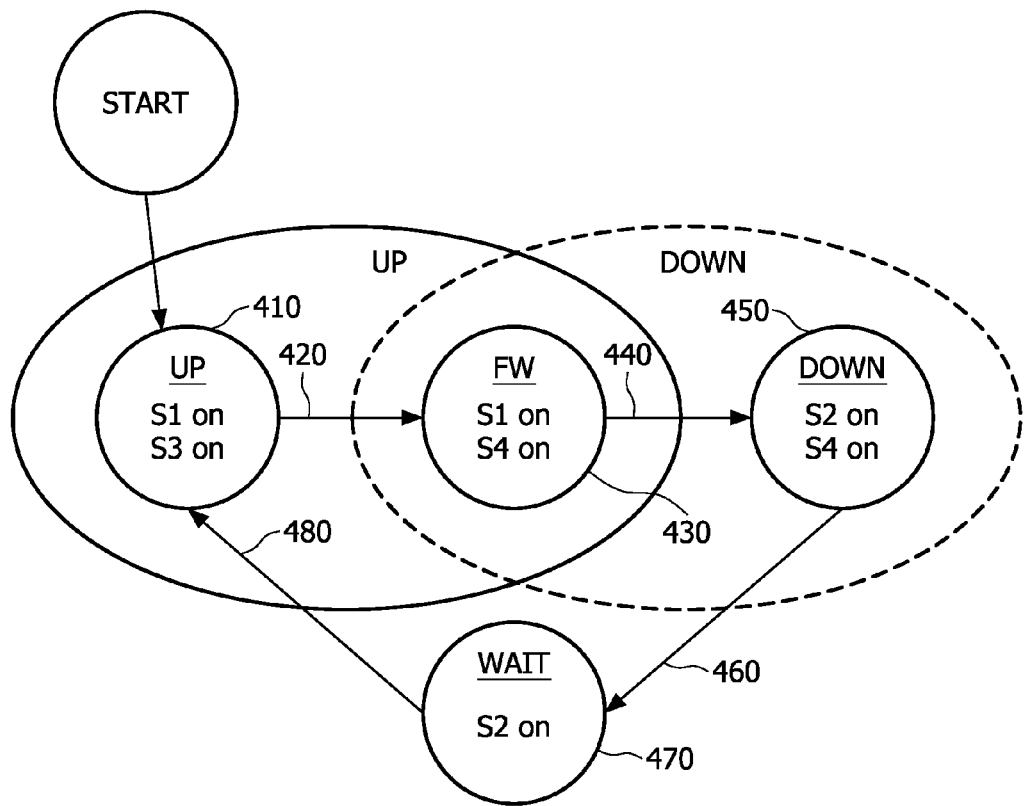
FIG. 5 shows the state diagram of the auto-mode of the device according to the invention.
Figure 6:
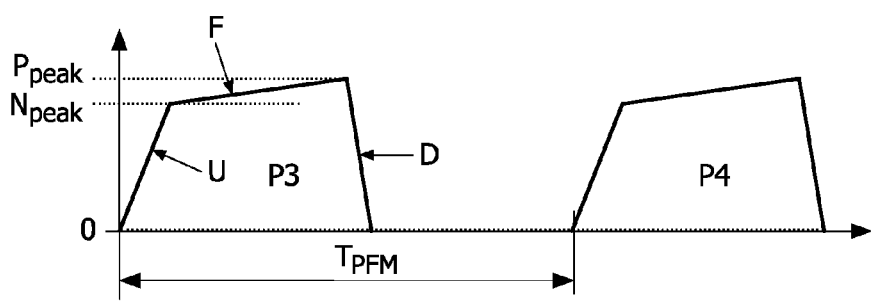
FIG. 6 is an example of a PFM pulse waveform of the auto-conversion mode of FIG. 5.

Now with reference to FIGS. 5 and 6, there is an automatic- or up/down-conversion mode (auto-conversion mode for short), with an up-phase, a forward-phase and a down-phase. A state diagram of the auto-conversion mode is shown in FIG. 5 and example current pulses P3 and P4 are illustrated in FIG. 6.

Accordingly, similar to the up-conversion mode, the auto-conversion mode starts an individual current pulse by an up-phase 410, in which the switching elements S1 and S3 are closed (whilst S2 and S4 are open) such that the up-phase current path is arranged to build up an increasing current in the coil L. The up-phase corresponds to the edge U of the current pulse P3 in FIG. 6.

Again, by means of setting and detecting a respective predetermined current value in the up-phase current path the end of the up-phase is controlled by means of the respective current value setpoint for the up-phase current path, which is set by the controller 200 in the DAC 132, as described above. A respective digital setpoint value provided from the controller 200 is converted by the DAC 132 into a respective analog value, which is provided to the first comparator 142. Again, in FIG. 6 the end of the up-phase is reached when the current in the up-phase current path reaches the predetermined setpoint value Npeak.

In FIG. 5, the up-phase of the current pulse P3 is followed by a forward-phase 430, in which the switching elements S1 and S4 are closed (whereas switching elements S2 and S3 are open) such that the forward-phase current path is arranged. The end of the forward-phase is now detected by the controller 200 by means of setting and detecting a respective predetermined current value in the forward-phase current path. The current value setpoint for the forward-phase current path in the auto-conversion mode is set by the controller 200 in the DAC 131. A respective digital setpoint value provided from the controller 200 is converted by the DAC 131 into a respective analog value, which is provided to the comparator 141. Hence, in FIG. 6 the end of the forward-phase (edge F) of the current pulse P3 is detected when the current in the forward-phase current path reaches the predetermined setpoint value Ppeak (440 in FIG. 5).

After the forward-phase 430 follows a down-phase 450, in which the switching elements S2 and S4 are closed (whereas switching elements S1 and S3 are open) such that the down-phase current path is arranged. By means of the current sensor 123, which indicates the end of the down-phase when a zero (0) current in the down-current path is measured (460). In FIG. 4, the down-phase is illustrated by the falling edge D of the current pulse P3.

Again, in FIG. 5, after the down-phase of a current pulse in the auto-conversion mode follows a wait-phase (which is not part of a current pulse), the end of which is detected by monitoring the output voltage at the terminal Vout. That is if the output voltage reaches a predetermined value below the desired output voltage the next current pulse will be started (480). In FIG. 5, the period $T_{PFM}$ is the time lapsed between the start points of two consecutive current pulses P3 and P4, which corresponds to the respective instant PFM frequency of the current pulses.

Figure 7:
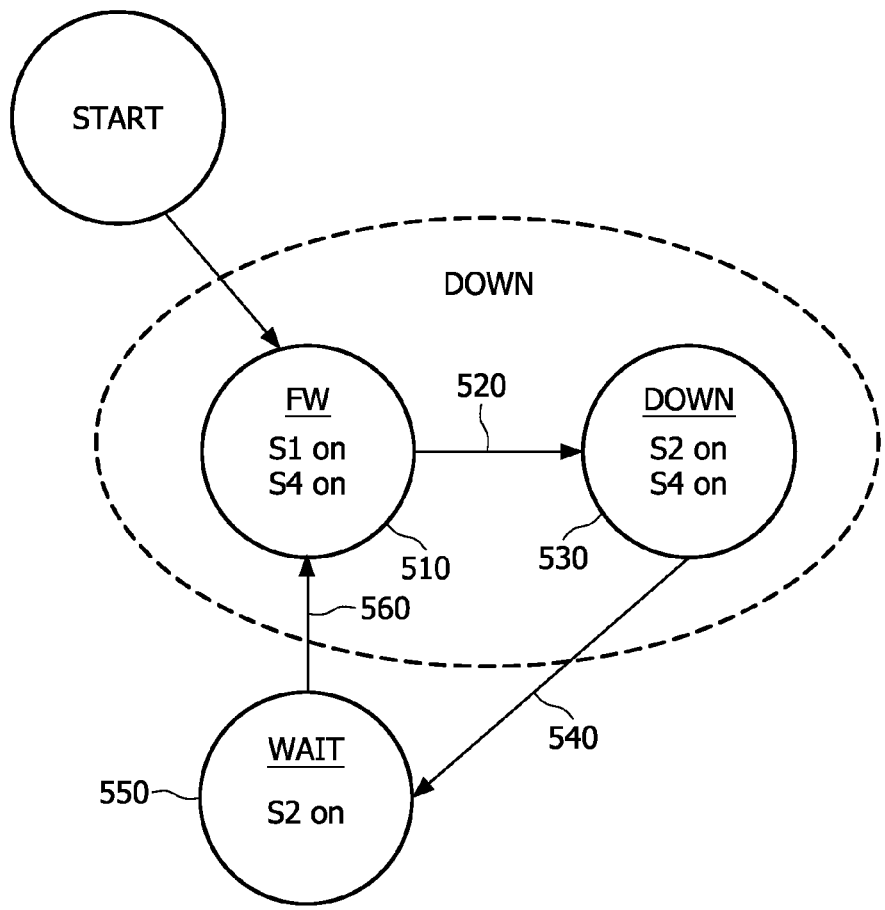
FIG. 7 shows the respective state diagram of the down-mode of the device according to the invention.
Figure 8:
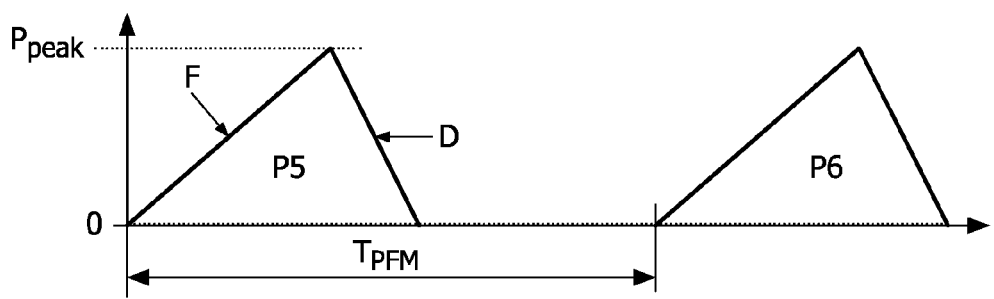
FIG. 8 is an example of a PFM pulse waveform of the down-conversion mode of FIG. 7.

As it regards the down-conversion mode, in which an individual current pulse comprises a forward-phase and a down-phase. A state diagram of the down-conversion mode is depicted in FIG. 7 and respective down-conversion mode current pulses P5 and P6 are illustrated in FIG. 8. In FIG. 7, the down-conversion mode starts an individual current pulse by a forward-phase 510, in which the switching elements S1 and S4 are closed (whereas switching elements S2 and S3 are open) such that the forward-phase current path is arranged to build up an increasing current in the coil L. It's worth noting that in the down-conversion mode the voltage at the input Vin is higher as at the output Vout. In FIG. 8, the forward-phase is depicted by the increasing edge F of the current pulse P5.

By means of setting and detecting a respective predetermined current value in the forward-phase current path the end of the forward-phase is controlled. In the converter 100 of FIG. 1 a respective current value setpoint for the up-phase current path is provided by the controller 200 to the comparator 141 via the DAC 131. Thus, the end of the forward-phase is detected (520) when the current in the forward-phase current path reaches the setpoint peak current value (peak current Ppeak in FIG. 8).

In FIG. 7, the forward-phase of the current pulse is followed by a down-phase 530, in which the switching elements S2 and S4 are closed (whereas switching elements S1 and S3 are open) such that the down-phase current path is arranged to deliver an electrical current via the coil L from ground potential GND to the output Vout. The end of the down-phase is detected by the controller 200 when the respective current sensor 123 indicates a zero (0) current in the down-current path (540). In FIG. 8, the down-phase is illustrated by the falling edge D of the current pulse P5.

In FIG. 7, after the down-phase of a current pulse in the down-conversion mode follows a wait-phase 550 (which is not part of a current pulse), the end of which is again detected by monitoring the output voltage at the terminal Vout. That is if the output voltage reaches a predetermined value below the desired output voltage the next current pulse will be started (560). In FIG. 8, the period $T_{PFM}$ is the time lapsed between the start points of two consecutive current pulses P5 and P6, which corresponds to the instant PFM frequency of the current pulses.

For an efficient operation the converter 100, in particular the controller 200, needs to know which of the state diagrams of FIGS. 3, 5, and 7 is actually valid. In particular, according to the perception of the present invention, the controller 200 needs to know whether to start with an up-phase or with a forward-phase after a down-phase.

For this purpose, the converter 100 of FIG. 1 comprises a conversion mode detector 220, which provides a respective conversion mode signal to the controller 200 such that the next current pulse is started with the applicable phase.

Figure 9:
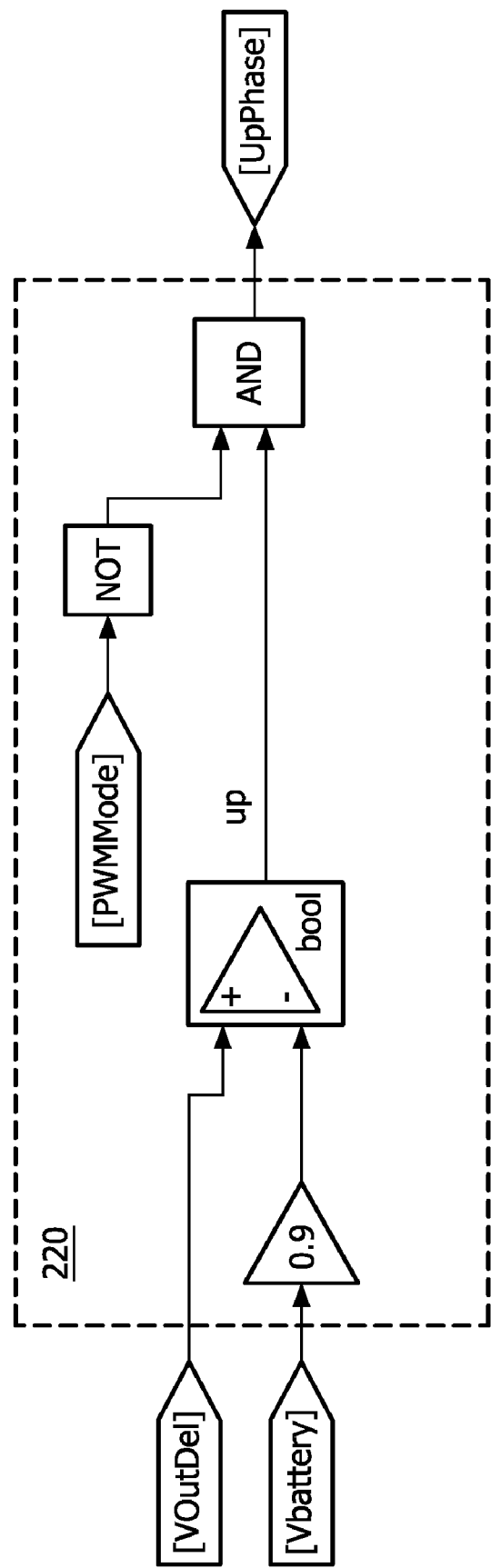
FIG. 9 is a Matlab model of a mode detector according to one embodiment.
Figure 10:
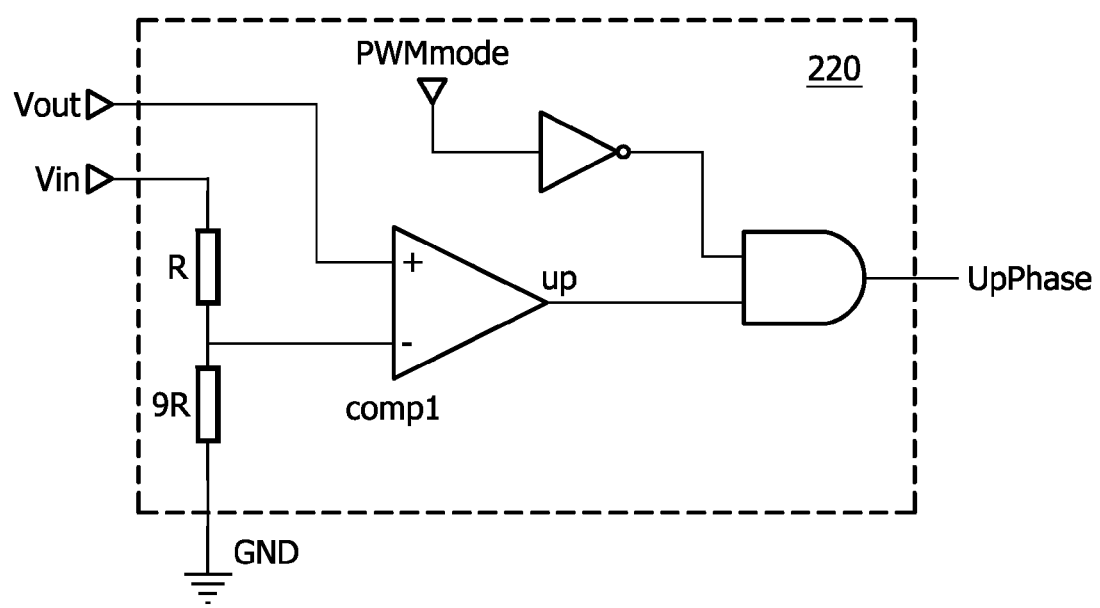
FIG. 10 is a schematic circuit diagram of a practical implementation of the mode detector of FIG. 9.

According to one embodiment, a mode detector 220 is comprised, for example, of a low-power amplifier and a small operational amplifier. FIG. 9 illustrates a Matlab model of the mode detector 220 and FIG. 10 shows a practical implementation of the mode detector 220, which is extracted from the converter 100 of FIG. 1. A conversion mode signal can be an "UpPhase"-signal provided by the mode detector 220, which can be a binary signal. The "UpPhase"-signal, for instance, can be "high" or "1" to indicate when a next PFM cycle should start with an up-phase. In turn, the "UpPhase"-signal, for instance, can be "low" or "0" to indicate when a next PFM cycle should start with a forward-phase.

As can be derived from FIGS. 3 and 5, the "UpPhase"-signal should indicate the PFM cycle to start with an up-phase in the up-conversion mode and in auto-conversion mode, when the voltage at Vout is above 90% of the voltage of Vin.

In experiments with the above described embodiment, as it regards determining the setpoint for defining applicable current phase ends (current mode control), the initial setpoint for the peak current (Npeak) comparator 142 has been set to a minimum of 18% (that is $3/16$) of its full-scale value. A more optimal or optimum setpoint value for the peak current value can be determined later, during the next PFM cycles, by measuring the length of a PFM pulse.

The setpoint for the peak current (Ppeak) comparator 141 is set to 10% more than the peak current setpoint of the peak current (Npeak) comparator 142. Further, in case the actual voltage at the input Vin is larger than the actual voltage at the output Vout, the current in the inductor L will increase during a forward-phase (S1 and S4 closed), thus the peak current comparator 141 will detect the end of the forward-phase. In case the actual voltage at the input Vin is smaller than an actual voltage at the output Vout, the current in the inductor L will not increase, but decrease during the forward-phase. Thus, to end the forward-phase, the setpoint of the peak current comparator 141 can be set to zero at the desired end of a PFM pulse.

Figure 11:
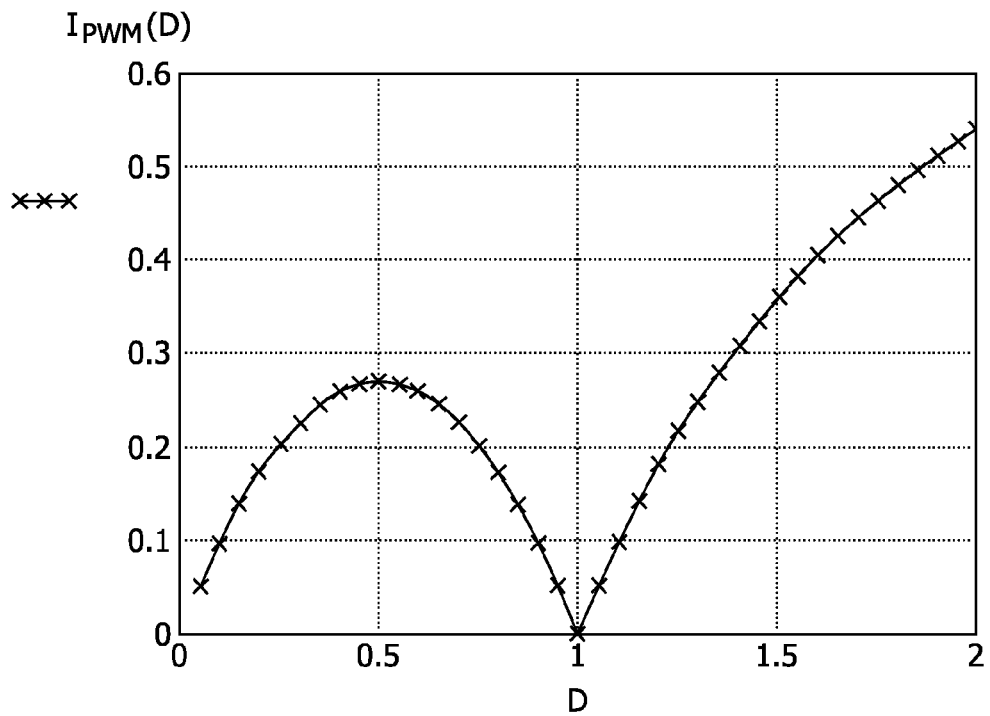
FIG. 11 shows DAC setpoint values for the minimum load current to keep the converter in PWM mode as a function of D=Vout/Vin, wherein Vin=5.4V.
Figure 12:
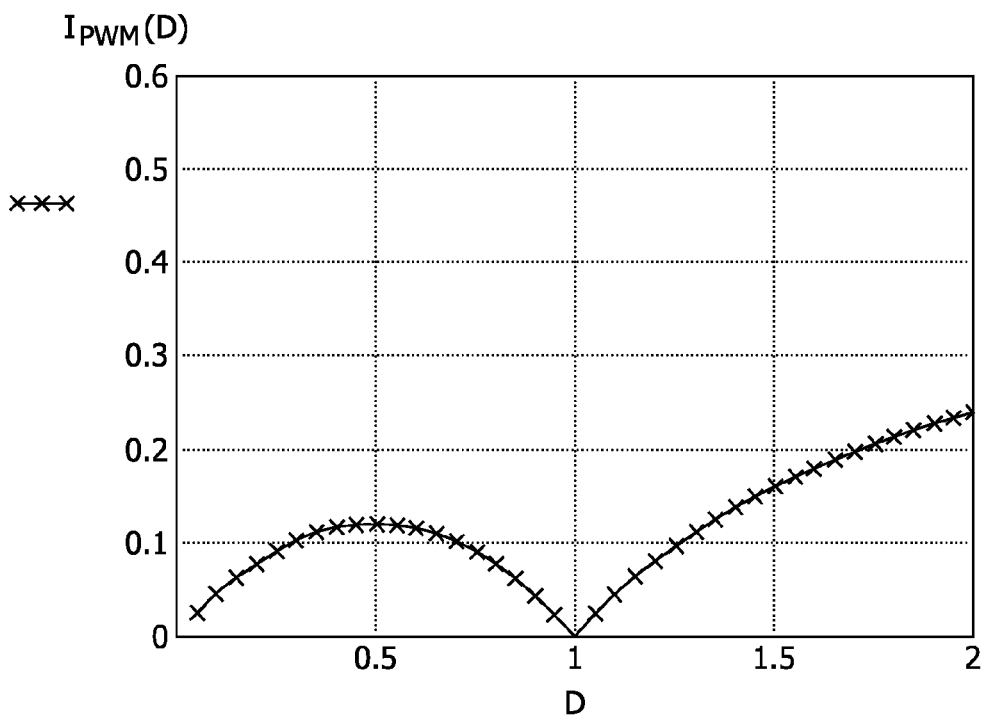
FIG. 12 shows the DAC setpoint for the minimum load current to keep the converter in PWM mode as a function of D=Vout/Vin, wherein Vin=2.4V.

As it regards reasonable starting values of the setpoint for the peak current comparators 14, 142, an approach is to use some graphs as FIGS. 11 and 12. FIG. 11 depicts the minimum load current to keep the converter 100 in PWM operation mode as a function of D, where D indicates the ratio Vout/Vin. It has been found that the peak current of the PFM pulse should be at least twice this value. It has further been found, to set the peak current for the PFM pulses high enough to prevent entering PWM mode again too soon.

It is worth noting, that the initial setting cannot be derived from the setpoint DACs, because the setpoint is equal to the average inductor current. As a consequence, just before entering PFM operation mode, the average current is close to zero. One useful compromise is to have a fixed setpoint at for example 20%, for an 8-bit DAC, this is about $51/256$. After the nominal cycle time, the down-phase setpoint is set to zero, to force a down-phase.

As it regards the length of a PFM-pulse, a desired length of a current pulse is preferably two PWM cycles. Accordingly, in the preferred embodiment, a clock with only twice the PWM frequency is used. During a current pulse, a counter counts the number of clock cycles. The controller 200 is configured to adjust the setpoint for the (Npeak) comparator 142. Accordingly, the current pulse duration is longer than the PWM frequency to obtain a hysteresis, resulting in saving on switching losses.

For switching from PWM operation mode to PFM operation mode, a useful condition to switch to PFM operation mode is that for a predetermined number, for instance for at least two times, a zero current is detected during a predetermined number, for example three, PWM periods and that the output voltage Vout is at its nominal value. Switching to PFM mode is done when the inductor current becomes zero, because at that moment, both switches are turned off.

For switch from PFM operation mode to PWM operation mode, an approach is to switch to PWM when the output voltage has been below its reference for at least a predetermined number, for example four, PWM periods/cycles. This means at least for two consecutive PFM cycles.

In summary, the present invention relates to voltage conversion in which a regulated output voltage is supplied by current pulses generated by the voltage conversion device from a voltage source. In particular, an improved control of a pulse frequency modulation (PFM) operation mode has been provided in which PFM pulses can be generated without the need for a high-frequency clock of a time controlled system. By having pulse phases that are current mode controlled and providing a mode detector to generate the right kind of current pulse, the high-frequency clock is no longer needed. Further, the presented solution allows for a higher PWM as well as PFM frequency, the external components of the converter can be made smaller. Eliminating the need for a high-frequency clock makes the device simpler, smaller and more energy-efficient.

The herein disclosed improved DC/DC-converter is useful for any application where regulated voltage is required from a variable input voltage source. Most applicable are battery power supplied application as mobile devices, alike audio players, for instance mp3-players, and handheld mobile communication or computer devices, such as cellular phones or personal digital assistance or a combination thereof. In general, the described converter is optimal for portable electronic equipment, which come with a battery pack for power supply, since the converter of the invention provides a stable output voltage over the whole range of the input voltage supplied by a battery pack. Further, due to the possible higher pulse frequency in PWM operation mode, smaller ceramic capacitors can be used and there is no further need for external components.

Finally but yet importantly, it must be noted that while the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A voltage conversion device comprising an input terminal, a ground terminal and an output terminal for providing a regulated output voltage from an current source connectable to the input terminal, the device comprising: a switching circuit with a plurality of switching elements and a switchable current path including an inductive element, the switchable current path being switchable such that the current path is arranged as a forward-phase current path connecting the input terminal and the output terminal, as an up-phase current path connecting the input terminal and ground terminal, or as a down-phase current path connecting the ground terminal and the output terminal; a control unit configured to operate the plurality of switching elements in accordance to at least one switching operation mode, in which a current is delivered to the output terminal via the switchable current path by current pulses comprising at least two phases; and a mode detector for detecting an actual converting mode of the device; wherein the control unit is further configured to control in a first switching operation mode the individual current pulses such that an individual phase of a individual current pulse is ended when a current in the respective switchable current path of the respective phase reaches a respective predetermined current setpoint value, and that upon an up-converting mode signal provided by the mode detector to the control unit, the control unit being configured to start after a down-phase with a up-phase for the next current pulse and otherwise with a forward-phase for the next current pulse.

2. The device according to claim 1, wherein the device further comprises: a first current sensor in the forward-phase current path, a first digital analog converter connected the control unit for setting a first predetermined current setpoint value, the output of the first current sensor and the output of the first digital analog converter being connected to a first comparator.

3. The device according to claim 1, wherein the device further comprises: a second current sensor in the up-phase current path, a second digital analog converter connected the control unit for setting a second predetermined current setpoint value, the output of the second current sensor and the output of the second digital analog converter being connected to a second comparator.

4. The device according to claim 1, wherein the control unit is further configured to control the individual current pulses of the first switching operation mode such that an forward-phase and an up-phase is ended upon detection of a predetermined peak current value in a respective switchable current path.

5. The device according to claim 1, wherein the control unit is further configured to control the current pulses of the first switching operation mode such that a down-phase is ended upon detection of a zero current in the down-phase current path.

6. The device according to claim 2, wherein, when the voltage at the input terminal is larger than an actual voltage at the output terminal, in a forward-phase the control unit is configured to detect the end of an actual forward-phase by means of an output signal of the first comparator.

7. The device according to claim 2, wherein, when the voltage at the input terminal is smaller than an actual voltage at the output terminal, the control unit is configured to set in a forward-phase the setpoint value for the first comparator to zero to detect the end of an actual forward-phase by means of an output signal of the first comparator.

8. The device according to claim 1, wherein the device further comprises: a counter for counting of the clock cycles during a current pulse, wherein a counter value of the counter is provided to the control unit, which is configured to adjust the second setpoint value such that a current pulse duration in the first switching operation mode is longer than in the second switching operation mode.

9. The device according to claim 1, wherein a nominal length of an individual current pulse of the first switching operation mode, being a pulse frequency modulation mode, is set to the length of at least two cycles of a second switching operation mode being a pulse width modulation mode.

10. The device according to claim 1, wherein the control unit is configured to set, after a predetermined nominal cycle time, a current value for the up-phase current path to zero such that a down-phase is forced.

11. A method for controlling a conversion operation of a variable input voltage to a regulated output voltage, wherein the output voltage is regulated by a controlled supply of electrical energy in from of current pulses, the method comprising: operating a plurality of switching elements of a switching circuit having a switchable current path with an inductive element such that a current pulse comprises at least two phases, of which in a forward-phase the current path provides current from the input to the output, in a up-phase the current path provides current from the input to ground, and in a down-phase the current path provides current from the ground to the output; controlling in a first switching operation mode the individual current pulses such that a individual phase of a individual current pulse is ended when a current in the respective switchable current path of the respective phase reaches a respective predetermined current setpoint value, and detecting whether an actual converting mode of the conversion operation is an up-converting mode or not; and starting after a down-phase of a current pulse, upon detection of the actual converting mode being an up-converting mode, the next current pulse with an up-phase and otherwise with a forward-phase.

* * * * *